(12) United States Patent
Patt, Jr. et al.

(10) Patent No.: US 8,459,205 B1
(45) Date of Patent: Jun. 11, 2013

(54) BIRDFEEDER AND BIRDFEEDER KIT

(76) Inventors: Douglas Charles Patt, Jr., Allentown, PA (US); Brian Benjamin Witlin, Menlo Park, CA (US)

(*) Notice: Subject to any disclaimer, the term of this patent is extended or adjusted under 35 U.S.C. 154(b) by 874 days.

(21) Appl. No.: 12/191,274

(22) Filed: Aug. 13, 2008

(51) Int. Cl.
*A01K 61/02* (2006.01)

(52) U.S. Cl.
USPC ............................................. 119/57.8

(58) Field of Classification Search
USPC ............... 119/428, 429, 431, 430, 433, 435, 119/474, 482, 498, 174, 52.2–52.3, 57.8–57.9; 220/4.28, 4.31, 4.32, 690, 682; 439/52, 109, 439/136, 137, 139, 394, 480
See application file for complete search history.

(56) References Cited

U.S. PATENT DOCUMENTS

| | | | |
|---|---|---|---|
| 2,634,705 A * | 4/1953 | Mayes .......................... | 119/57.8 |
| 2,746,665 A * | 5/1956 | Wiggins ........................ | 229/121 |
| 2,891,711 A * | 6/1959 | Early ............................. | 229/221 |
| 2,915,040 A * | 12/1959 | Ward ............................. | 119/431 |
| 3,115,865 A * | 12/1963 | Parkes et al. .................. | 119/52.2 |
| 4,140,065 A * | 2/1979 | Chacon ......................... | 108/156 |
| 4,947,797 A * | 8/1990 | Lawrence, Jr. ................ | 119/52.2 |
| 4,958,595 A * | 9/1990 | Richman et al. .............. | 119/52.2 |
| 5,170,747 A * | 12/1992 | Strangio ....................... | 119/428 |
| 5,263,766 A * | 11/1993 | McCullough ............. | 297/440.13 |
| 5,291,854 A * | 3/1994 | Tzanet et al. ................. | 119/52.2 |
| 5,372,094 A * | 12/1994 | Zens ............................. | 119/52.2 |
| 6,619,749 B2 * | 9/2003 | Willy ....................... | 297/440.13 |
| 6,637,373 B2 * | 10/2003 | Rasmussen .................. | 119/431 |
| 7,347,162 B2 * | 3/2008 | Zieff et al. ................... | 119/52.3 |
| 2005/0132972 A1* | 6/2005 | Scott et al. .................... | 119/431 |
| 2006/0237455 A1* | 10/2006 | Vargas .......................... | 220/4.34 |

* cited by examiner

Primary Examiner — Monica Williams
Assistant Examiner — Joshua Huson
(74) Attorney, Agent, or Firm — Peters Verny, LLP (57) ABSTRACT

A birdfeeder that is easily packed, delivered, assembled and disassembled. The birdfeeder is comprised of eight ⅛" thick, flat parts that lock together by taking advantage of gravity and friction created by the use of a keyed mortise and tenon connection, such as that common to wood construction at the turn of the century. The eight parts disassembled pack flat as a kit for shipping and stocking. Once received the birdfeeder kit is easily assembled & disassembled, optionally without the use of tools or fasteners.

18 Claims, 10 Drawing Sheets

STEP 1

STEP 2

STEP 3

STEP 4

STEP 5

STEP 6

STEP 7

STEP 8

STEP 9

STEP 10

STEP 11

STEP 12

BIRDFEEDER AND BIRDFEEDER KIT

BACKGROUND OF THE INVENTION

1. Field of the Invention

The present invention is in the field of animal feeding and more specifically in the field of bird feeding.

2. Related Art

A birdfeeder is an object that stores and provides food for birds. Birdfeeders can be found in both urban and suburban areas and are useful for feeding birds in a variety weather condition in many locations. Birdfeeders can serve to gather birds for watching or provide feed during harsh seasons that can make food scarce. Birdfeeders are frequently hung from a tree or bracket, or can be set atop an object like a post. Birdfeeders may be made from a number of materials and come in a variety of configurations depending upon the type of birdfeed and/or birds that are desired to be attracted to a particular location.

Common birdfeeder configurations may not lend themselves to be shipped in a cost effective manner because of their bulky size and/or heavy weight. Most birdfeeders are also made in conventional configurations that are not aesthetically progressive or interesting. Some birdfeeders may also require assembly when they are removed from their shipping box. This assembly generally requires the use of tools.

SUMMARY

The present invention relates to a birdfeeder that principally comprises a number of flat components. Typically, these flat components are easily packed, shipped, assembled and disassembled. These components optionally do not require tools and/or fasteners for assembly. The birdfeeder kit utilizes a variation of keyed mortise and tenon connections, such as those common to wood construction.

In various embodiments the invention includes a kit comprised of approximately eight rigid flat components made of solid construction. The components have a multitude of slots and openings that enable them to be locked together utilizing friction and gravity to form a birdfeeder.

In various embodiments some or all of the components of the kit are transparent, opaque or semi-opaque, rigid or semi-rigid, or some combination thereof. Surfaces of these components may be textured, imprinted, figured, colored or veneered.

Various embodiments of the invention include a system comprising: a pair of flat end panels each including a plurality of slots, the pair of flat end panels including at least one opening; a first side panel configured to slide into at least two slots of each of the end panels, and including at least one slot; and a second side panel configured to slide into at least two slots of each of the end panels and to slide into the slot of the first side panel, and configured to form a container, the container including the opening disposed adjacent to a troth formed by extensions of the first side panel and the second side panel.

Various embodiments of the invention include a method comprising: selecting a first end panel and a second end panel, each of the first end panel comprising a wide slot and a narrow slot; sliding a first side panel into the wide slot the first end panel; sliding the first side panel into the side slot of the second end panel; sliding a second side panel into the narrow slot of the first end panel, the narrow slot of the second end panel and a slot of the first side panel so as to form a v-shaped container, the v-shaped container comprising at least one hole configured to allow contents of the container to fall into a trough formed by the first side panel and the second side panel.

Various embodiments of the invention include a kit comprising: a plurality of flat panels each including slots, the panels configured to form a birdfeeder when assemble by sliding the panels into the slots; and packaging configured to hold the plurality of flat panels in a flat stacked geometry.

Various embodiments of the invention include a method comprising: receiving flat stock material; and cutting the receive flat stock material into a pair of flat end panels each including a plurality of slots, the pair of flat end panels including at least one opening configured to pass birdseed, a first side panel configured to slide into slots of the end panels, and including at least one slot, and a second side panel configured to slide into the slots of the end panels and to slide into the slot of the first side panel, and configured to form a v-shaped birdfeeder.

BRIEF DESCRIPTION OF THE DRAWINGS

The present invention may be better understood, and its numerous features and advantages made apparent to those skilled in the art by referencing the accompanying drawings. For ease of understanding and simplicity, common numbering and lettering of elements within the illustrations is employed where an element is the same in different drawings.

DETAILED DESCRIPTION

Embodiments of the invention include a birdfeeder that comprises a plurality of interlocking pieces. These pieces are optionally cut from flat stock material. The use of flat pieces may allow the disassembled birdfeeder to be more easily packed, stocked and shipped, relative to birdfeeders of the prior art. The plurality of pieces interlock using slots and tabs. In some embodiments, these slots and tabs are configured such that the birdfeeder can be assembled and disassembled without the use of tools and/or fasteners. For example, without the use of bolts, screws, rivets, clips or nails. The interlocking nature of the pieces may also make the birdfeeder easier to refill, relative to birdfeeders of the prior art. In some embodiments, the pieces are interlocked using a modified keyed mortise and tenon 'keyed' joint, such as those commonly found in wood construction in the late 1800s.

Figure 1:
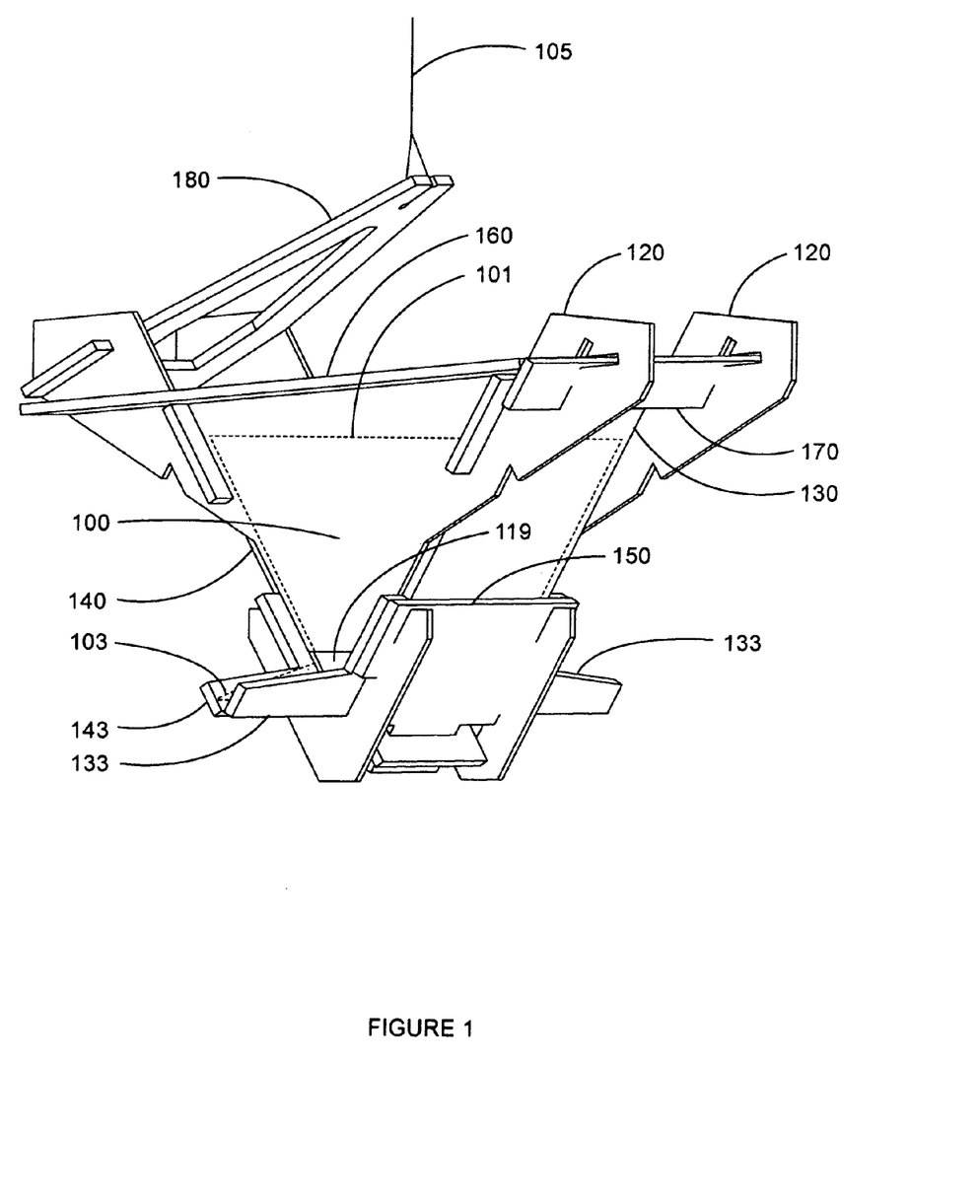
FIG. 1 illustrates an assembled birdfeeder, according to various embodiments of the invention.

FIG. 1 illustrates an assembled birdfeeder 100, according to various embodiments of the invention. Birdfeeder 100 is comprised of a plurality of flat pieces configured to be interlocked together. These flat pieces are typically on the order of 1/8" thick, although as described elsewhere herein their thickness may vary. The pieces of birdfeeder 100 may be classified into three groups, body pieces that are configured to form the body of birdfeeder 100, locking pieces that are configure for locking pieces in place, and one or more support pieces configured to support the birdfeeder 100. In alternative embodiments, locking pieces and/or support pieces are formed from round stock rather than flat stock.

The birdfeeder 100 illustrated in FIG. 1 is optionally provided as a kit including at least the body pieces and the locking pieces. This kit is optionally packaged such that the body pieces are stacked together in a stacked parallel geometry. This geometry minimizes a thickness of the packaged kit.

The embodiments of birdfeeder 100 illustrated in FIG. 1 are composed of eight flat parts. Birdfeeder 100 may be hung by a string 105 and a support piece from a tree, post, shepard's crook, or the like. In these embodiments the body of birdfeeder 100 includes six flat body pieces and two optionally flat locking pieces. More specifically, the body is composed of body pieces comprising two end panels 120, a tall side panel 130, a short side panel 140 and an optional roof piece 160. These body pieces are held together by an optional body-locking piece 150 and an optional roof-locking piece 170. Birdseed may be added to birdfeeder 100 by temporally removing roof piece 160. A cavity formed by end panels, tall side panel 130 and short side panel 140 is configured to be filled with birdseed 101 (represented by a dotted line in FIG. 1). When birdseed 101 is poured into the cavity of birdfeeder 100 some of the birdseed 101 will spill out of end panels 120 through one or more openings 119. This birdseed 101 will fall into a v-shaped trough that is formed by one or more extensions 133 of tall side panel 130 and one or more extensions 143 of short side panel 140. Birds may perch on extensions 133 and extensions 143 to feed on the birdseed held therein. FIGS. 2-8 illustrate further details of the pieces of birdfeeder 100 illustrated in FIG. 1.

Figure 2:
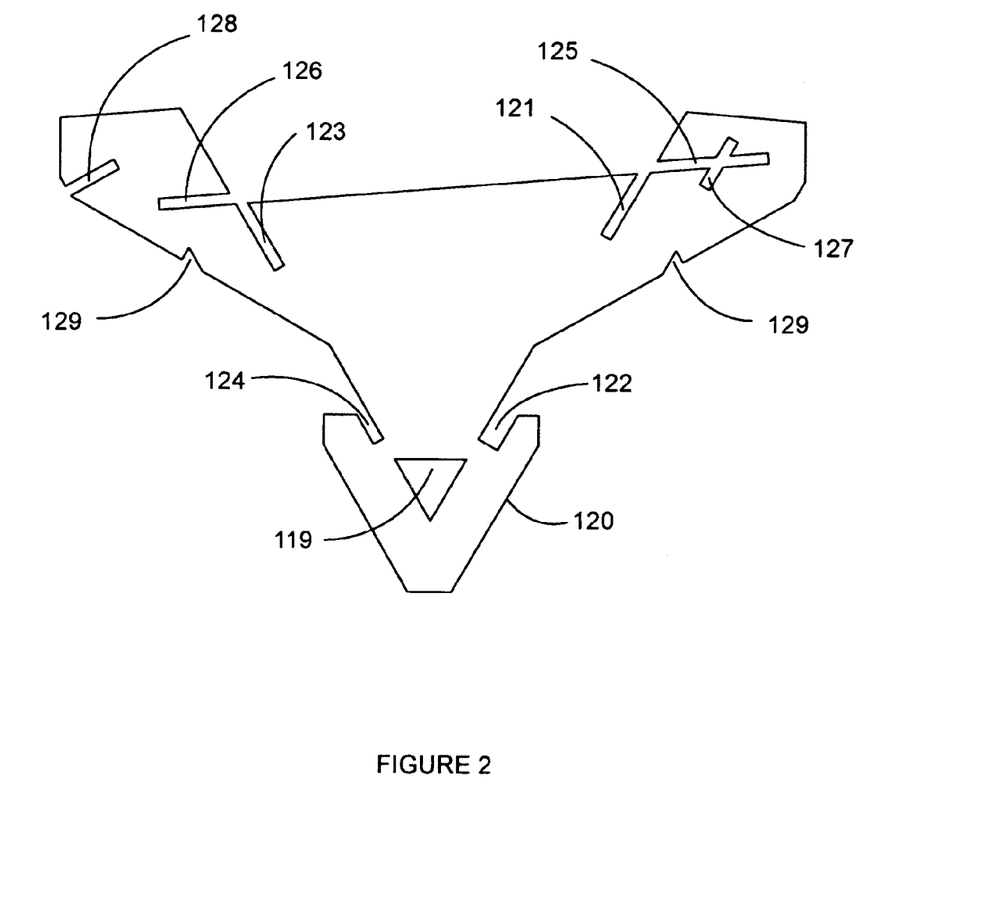
FIG. 2 illustrates an end panel, according to various embodiments of the invention.

FIG. 2 illustrates end panels 120 that include a plurality of slots labeled 121 through 128, and notches labeled 129. End panels 120 further include one or more optional opening 119. At least one of end panels 120 includes opening 119. Opening(s) 119 is(are) the location at which birdseed spills from the cavity formed by the body pieces into the trough created by extensions 133 and extensions 143. In some embodiments, a single opening 119 includes several holes.

Slots 121 and 123 through 128 are characterized by a width approximately equal to the thickness of parts 130, 140, 160, 170 and 180. Slot 122 is characterized by a width approximately equal to a sum of the thicknesses of parts 150 and 130. The interlocking of pieces and slots is optionally performed without tools and/or fasteners.

Optional hanger piece 180 (See FIG. 8) is configured to fit into optional slots 128 of End panels 120 at slots 183 of hanger piece 180. Tall side panel 130 (See FIG. 3) is configured to fit into slots 121 and 122 of end panels 120 at slots 131 and 132, respectively. Short side panel 140 (See FIG. 4) is configured to fit into slots 123 and 124 of end panels 120 at slots 141 and 142, respectively. Body-locking piece 150 (See FIG. 5) is configured to fit into slots 122 of end panel 120 at slots 151 while disposed against tall side panel 130. Slots 122 of end panels 120 are configured to receive both tall side panel 130 and body locking body-locking piece 150 to create a keyed mortise and tenon connection together with short side panel 140.

Roof piece 160 (See FIG. 6) is configured to fit into slots 125 and 126 of end panels 120. Roof-locking piece 170 (See FIG. 7) is configured to fit into slots 127 of end panels 120 at slots 171.

Optional notches 129 are cut-outs placed in end panels 120 to serve as drip edges for water that runs down the edge of end panels 120. One of the desired result of notches 129 is optionally that beads of water that run down the edge of end panels 120 from above notches 129 will be stopped or slowed by the notch. Typically, notches 129 are configured to reduce an amount of water reaching the troughs formed by extensions 143 and 133. Notches 129 are optionally used to hang birdfeeder 100 using, for example strings, wires, or the like.

The thickness of end panels 120, tall side panel 130 and/or short side panel 140 are typically 1/8" in the embodiments discussed herein, however, in alternative embodiments one or more of these panels are approximately 1/16", 3/16", 1/4", 5/16", 3/8", 7/16" 1/2", or 3/4" thick, or some thickness between any pair of these values. Other pieces of birdfeeder 100 discussed herein may be of similar dimensions.

End panels 120, tall side panel 130, short side panel 140, and/or optionally other pieces discussed herein may be made from plastic, polycarbonate, acrylic, metal, wood, or stone, clay, cloth, polymer, or the like. End panels 120, tall side panel 130 and/or short side panel 140, and/or other pieces described herein may be injection molded, milled, formed from flat stock, or the like. Different parts of birdfeeder 100 may comprise different materials, may be transparent or opaque to varying degrees, may be veneered, and/or may be textured or colored. Birdfeeder 100 is optionally constructed of material resistant to ultraviolet light.

Figure 3:
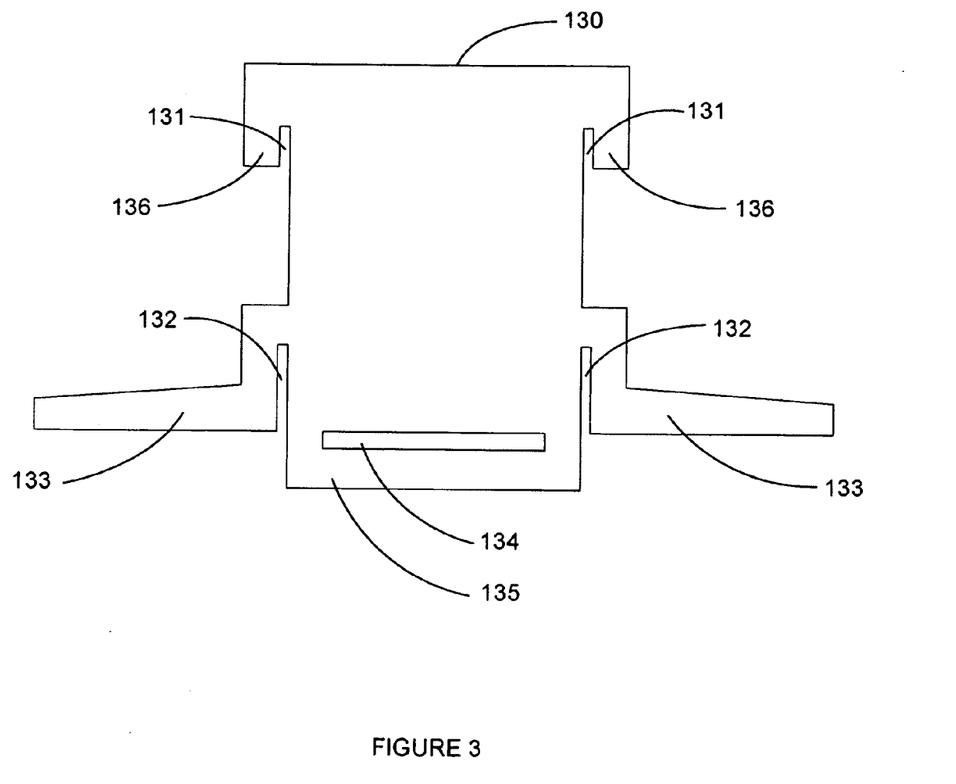
FIG. 3 illustrates a tall side panel, according to various embodiments of the invention.

FIG. 3 illustrates tall side panel 130 that includes an opening 134, slots 131 and 132, extensions 133, and tabs 135 and 136. Opening 134 is configured to receive a tab 145 of short side panel 140 thereby forming two of the three parts of a keyed mortise and tenon connection. Slots 131 and 132 are characterized by a width approximately equal to the thickness of end panels 120. End panels 120 are configured to fit into slots 131 and 132 of tall side panel 130 at slots 121 and 122 respectively. Tall side panel 130 is locked into place by friction and gravity and extensions 133 and tabs 136. Extensions 133 of tall side panel 130 together with extensions 143 of short side panel 140 from the v-shaped trough. Birds can perch and feed on extensions 133 of tall side panel 130 together with extensions 143 of short side panel 140. Tab 135 forms the bottom of opening 134.

Figure 4:
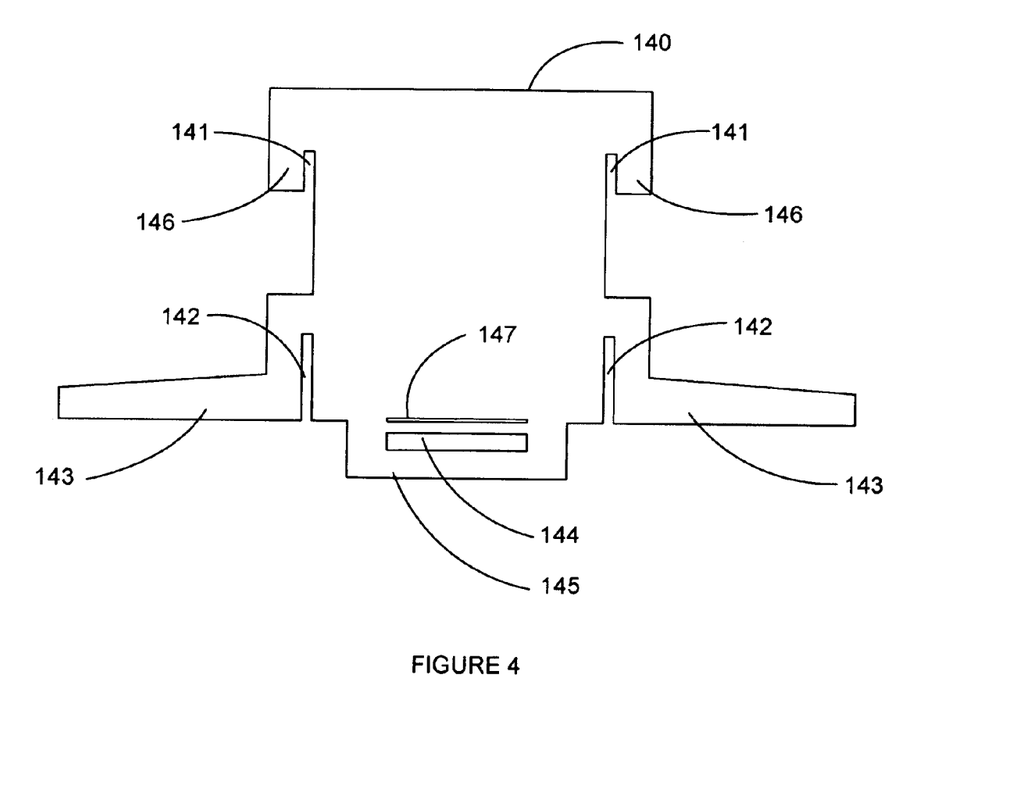
FIG. 4 illustrates a short side panel, according to various embodiments of the invention.

FIG. 4 illustrates short side panel 140 that includes two openings 144 and 147, slots labeled 141 and 142, extensions 143 and tab 145. Opening 144 is configured to receive tab 153 of body-locking piece 150 thereby forming the third of three parts, along with tall side panel 130, of a keyed mortise and tenon connection. In this connection opening 144 is the mortise and tab 153 is the tenon. The tenon is locked into the mortise by body-locking piece 150, which is configured to function as the key. Slots 141 and 142 are characterized by a width approximately equal to the thickness of end panels 120. End panels 120 are configured to fit into slots 141 and 142 of short side panel 140 at slots 123 and 124 respectively. Short side panel 140 is configured to be locked into place by friction and gravity and extensions 143 and slots 141. The bottom of optional opening 147 sits at the interior juncture of tall side panel 130 and short side panel 140 when birdfeeder 100 is assembled. In some embodiments, the purpose of opening 147 is twofold. Firstly, opening 147 is configured to allow air to circulate on the interior of birdfeeder 100 when it is filled with birdseed. The additional air provided by the opening in short side piece 140 may assist in the drying of any water within the interior of the body of birdfeeder 100. Secondly, any water that ends up on the interior of the body of birdfeeder 100 can filter through the birdseed and down to the location of opening 147 and ultimately out of the feeder. Opening 147 is optional or may be configured in another geometrical configuration or at another location on short side panel 140. In typical embodiments, opening is less than ¼", ⅛", 3/32" or 1/16" thick. Opening 156 is optionally covered by a screen (not shown) configured to prevent birdseed from passing thorough opening 156.

Figure 5:
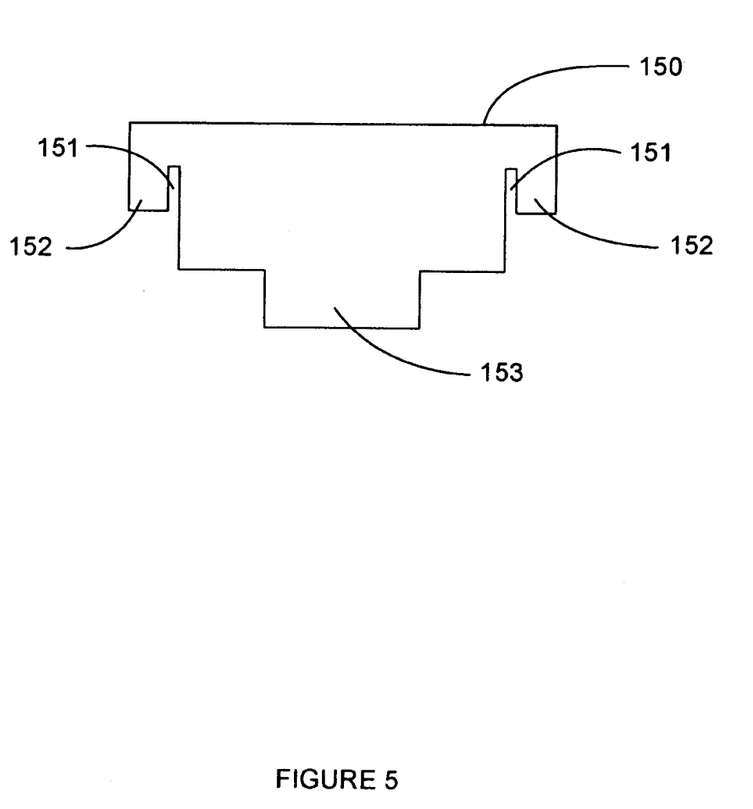
FIG. 5 illustrates a body-locking piece, according to various embodiments of the invention.

FIG. 5 illustrates body-locking piece 150 that includes slots 151, tabs 152 and 153. Slots 151 are characterized by a width approximately equal to the thickness of end panels 120. End panels 120 are configured to fit into slots 151 of body-locking piece 150 at slots 122. Body-locking piece 150 is typically locked into place by friction and gravity and tabs 152. When assembled, tab 153 slides through opening 144 of short side piece 140 forming the locking piece and the third of three parts required for a keyed mortise and tenon connection. Body-locking piece 150 is optionally tapered in its thickness.

Figure 6:
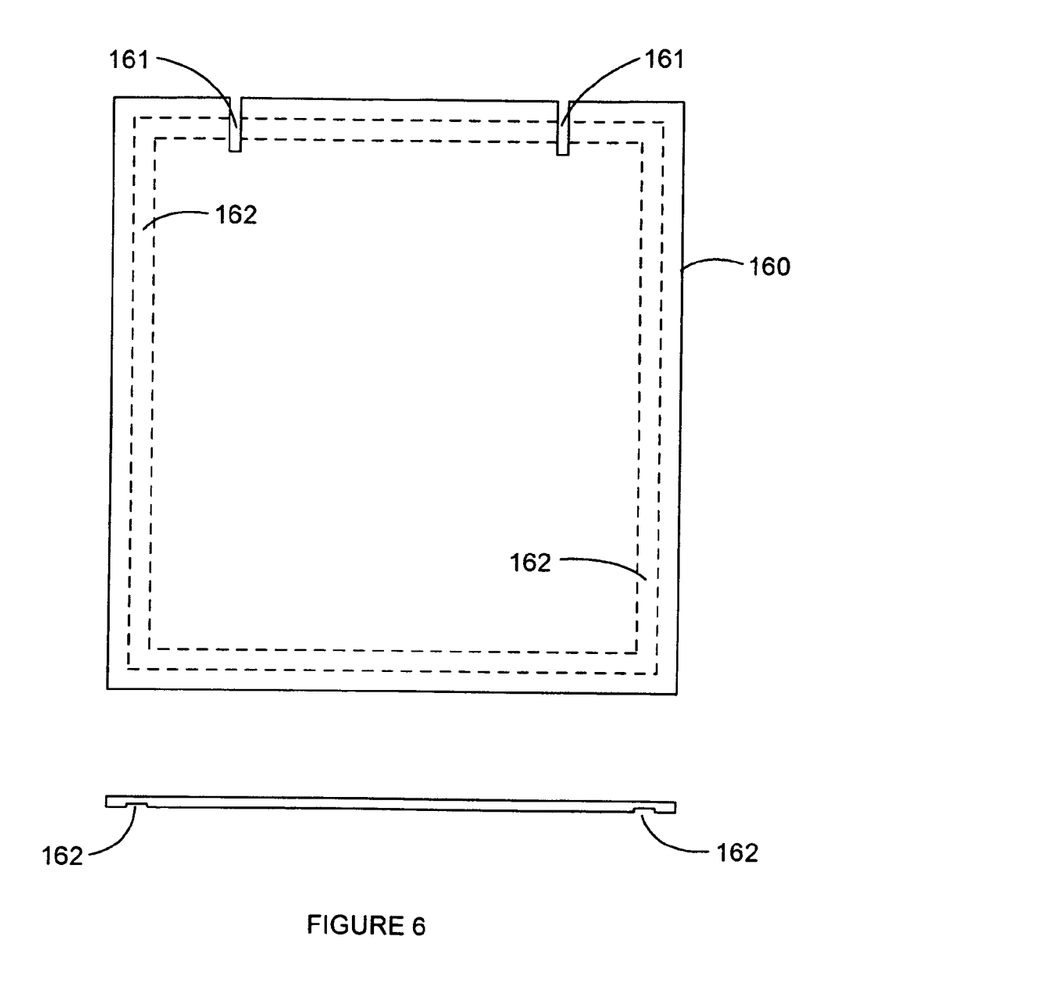
FIG. 6 illustrates a roof piece, according to various embodiments of the invention.

FIG. 6 illustrates optional roof piece 160 that includes slots 161 and optional recess 162. Slots 161 are characterized by a width approximately equal to the thickness of end panels 120. During assembly roof piece 160 is fit into slots 125 and 126 of end panels 120. Once slots 161 of roof piece 160 align with slots 126 of end panels 120, roof piece 160 can be slid into place. At this juncture end panels 120 fit into slots 161 of roof piece 160 at slots 126. Roof piece 160 is held into place by friction and gravity and the locking configuration of slots 126 of end panels 120 and slots 161 of roof piece 160. Recess 162 is disposed to face in the downward direction as roof piece 160 is slid into place. Recess 162 is configured to function as drip edges, for example approximately ¼" in width and 1/16" in depth. Recesses 162 are placed in roof piece 160 for water that runs along the underside of roof piece 160 and toward the interior of the body of birdfeeder 100 where the birdseed is kept. In some embodiments, a desired result of recess 162 is that beads of water that run back in toward the birdseed storage location will be stopped or slowed. Recess 162 is optional or may be configured in another geometrical configuration or at another location on roof piece 160. Recess 162 optionally includes a plurality of recesses.

Figure 7:
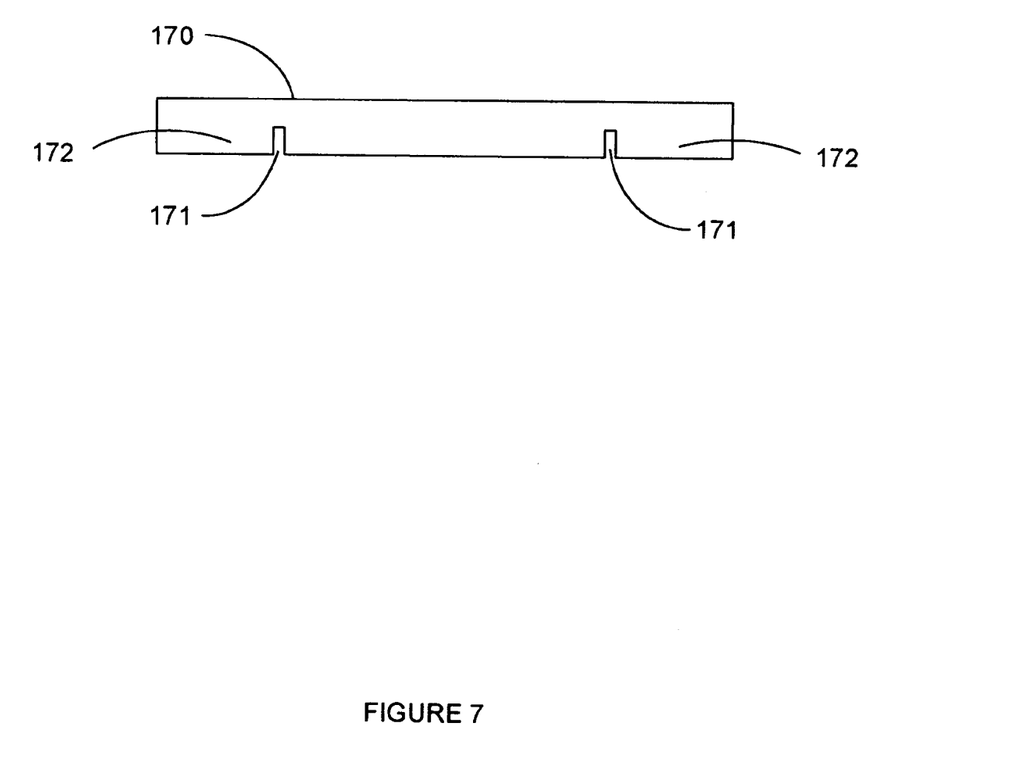
FIG. 7 illustrates a roof-locking piece, according to various embodiments of the invention.

FIG. 7 illustrates an optional roof-locking piece 170 that includes slots 171 and tabs 172. Slots 171 are characterized by a width approximately equal to the thickness of end panels 120. End panels 120 fit into slots 171 of roof-locking piece 170 at slots 127. Roof-locking piece 170 is held into place by friction and gravity as well as tabs 172. Roof-locking piece 170 is configured to lock roof piece 160 in place by maintaining a barrier to roof piece 160 sliding toward short side panel 140.

Figure 8:
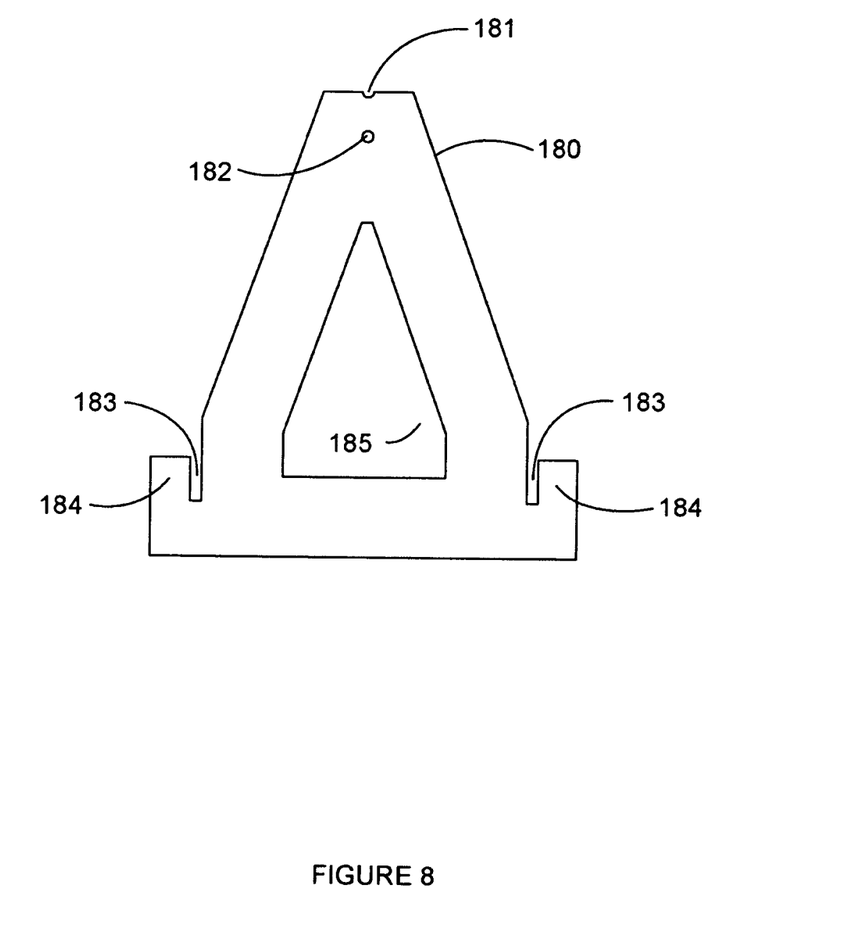
FIG. 8 illustrates a hanger piece, according to various embodiments of the invention.

FIG. 8 illustrates optional hanger piece 180 that includes notch 181, hole 182, slots 183, tabs 184 and opening 185. Notch 181 and hole 182 are fashioned to received and hold a piece of string, cable, chain, line, pole, rod, or the like to serve the purpose of hanging birdfeeder 100 from a stationary object. A wire may be run through hole 182 and secured within notch 181 as well as tied a stationary object for hanging birdfeeder 100. Hanger piece 180 is configured to be held in place by gravitational force due to the fixed end of the line above birdfeeder 100 on a stationary object and the weight of birdfeeder 100 filled or unfilled with birdseed. Slots 183 are characterized by a width approximately equal to the thickness of end panels 120. End panels 120 are configured to fit into slots 183 of hanger piece 180 at slots 128. Hanger piece 180 is locked into place by friction and gravity and tabs 184. Opening 185 is decorative and optional. Opening 185 also assists as an alternate location for the user to pour birdseed into the body of birdfeeder 100.

Figure 9:
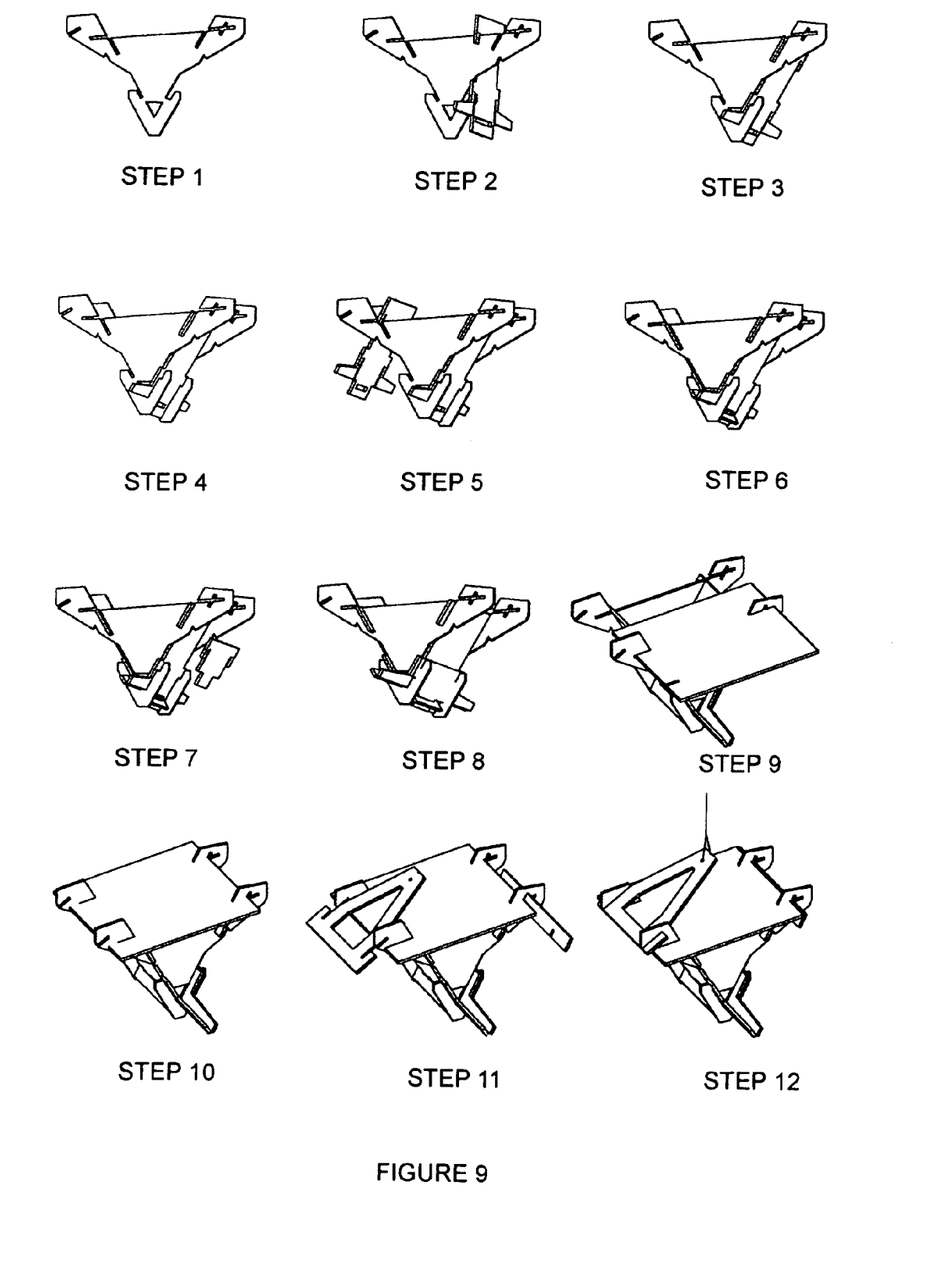
FIG. 9 illustrates a method of assembling the birdfeeder of FIG. 1, according to various embodiments of the invention.

FIG. 9 illustrates the assembly of birdfeeder 100 in various steps, according to various embodiments of the invention. In alternative embodiments, the illustrated steps are performed in alternative orders. In a step 1, one of end panels 120 is selected.

In a step 2 tall side panel 130 is disposed in contact with the end panel 120 selected in step 1. End panel 120 receives tall side panel 130 at slots 131.

In a step 3 tall side panel 130 is secured onto end panel 120 at slots 121 and 122 by sliding into these slots. Specifically, slot 131 of tall side panel 130 is slid into slot 121 of end panel 120 at the same time that slot 132 of tall side panel 130 is slid into slot 122 of end panel 120. Tall side panel 130 is secured when it is pushed in a downward motion until the limits of the slots are achieved. Tall side panel 130 stays in place, for example, by virtue of the friction created between the parts as well as the gravitational force that acts on tall side panel 130 keeping it secured on end panel 120. Tab 136 and extension 133 of tall side panel 130 also act to secure tall side panel 130 on end panel 120 by forming slots 131 and 132.

In a step 4 the second end panel 120 is secured onto the opposite side of tall side panel 130. Slot 131 of tall side panel 130 is slid into slot 121 of second end panel 120 at the same time that slot 132 of tall side panel 130 is slid into slot 122 of second end panel 120. Tall side panel 130 is secured when it is pushed in a downward motion until the limits of the slots are achieved. Tall side panel 130 stays in place by virtue of the friction created between the parts as well as the gravitational force that acts on tall side panel 130 keeping it secured on second end panel 120. Tab 135 and extension 133 of tall side panel 130 also act to secure tall side panel 130 on second end panel 120 by forming slots 131 and 132.

In a step 5 short side panel 140 is disposed in contact with both end panels 120. Slots 141 and 142 of short side panel 140 receive both end panels 120.

In a step 6 short side panel 140 is secured onto both end panels 120. Slots 141 of short side panel 140 are slid into slot 123 of end panels 120 at the same time that slots 142 of short side panel 140 are slid into slots 124 of panels 120. As short side panel 140 is slid in a downward direction, tab 145 of short side panel 140 slides through opening 134 which is just above tab 135 of tall side panel 130. Short side panel 140 is secured when it is pushed in a downward motion until the limits of the slots are achieved. Short side panel 140 stays in place by virtue of the friction created between the parts as well as gravitational force that act on short side panel 140 keeping it secured on end panels 120. Tabs 146 and extensions 143 of short side panel 140 also act to secure short side panel 140 on end panels 120 by locking through openings 134 and 144.

In a step 7 body-locking piece 150 is disposed adjacent to short side panel 140 and slots 122. In a step 8 body-locking piece 150 is used to lock short side panel 140 and tall side panel 130 into place. Specifically, body-locking piece 150 is slid onto slots 122 of end panels 120 at corresponding slots 151 of body-locking piece 150. As body-locking piece 150 is slid in a downward motion it is configured to pass through opening 144 of short side panel 140. Body-locking piece 150 is secured when it is pushed in a downward motion until the limits of slots are achieved. Body-locking piece 150 stays in place by virtue of the friction created between the parts as well as the gravitational force that acts on body-locking piece 150 keeping it secured on end panels 120. Tab 152 of body-locking piece 150 also act to secure it in place by forming slots 151. End panels 120 together with tall side panel 130, short side panel 140 and body-locking piece 150, make up the body of the birdfeeder 100. Once in place body-locking piece 150 secures the body of birdfeeder 100. Once this body is secured, birdseed may be added, stored and/or delivered.

In a step 9 roof piece 160 as it is slid into place above the body of birdfeeder 100. Recess 162 is disposed to face in the downward direction (toward the body). Roof piece 160 can be slid into end panels 120 from either side of birdfeeder 100. Slots 161 of roof piece 160 are disposed to the sides of slots 125 of end panels 120.

In a step 10 roof piece 160 is secured into place on end panels 120. Roof piece 160 is slid into end panels 120 at slots 125 and 126 until slots 161 of roof piece 160 align with end panels 120. At that point, roof piece 160 is slide onto end panels 120 as slots 161 are received by corresponding slots 126 of end panels 120. Roof piece 160 is configured to stay in place by virtue of the friction created between the parts as well as the minimal gravitational force that act on roof piece 160 keeping it secure on end panels 120.

In an optional step 11 hanger piece 180 is disposed relative to end panels 120. Step 11 optionally includes inserting roof-locking piece 170 into slots 127 of end panels 120. Roof-locking piece 170 is disposed such that slots 171 are facing in the downward direction. Step 11 optionally includes insertion of roof-locking piece 170 without use of hanger piece.

In a Step 12 hanger piece 180 is secured into place on end panels 120. Hanger piece 180 is slid onto end panels 120 where slots 183 of hanger piece 180 correspond with slots 128 of end panels 120. Hanger piece 180 is secured when it is pushed in an upward diagonal motion until the limits of the slots are achieved. Tabs 184 of hanger piece 180 also act to secure it in place by forming slots 183. Friction created between the parts also act to secure hanger piece 180 in place. As described elsewhere herein, hole 182 and notch 181 accommodate a hanger, such as a string, etc. Hole 182 and notch 181 are typically disposed approximately over a center of mass of birdfeeder 100. Hanger piece 180 is locked into place by virtue of the opposing forces of friction and gravity acting on birdfeeder 100 in a downward direction and a piece of secured string pulling hanger piece 180 in an upward direction. Step 12 optionally also includes securing roof-locking piece 170 into place on end panels 120. Specifically, roof-locking piece 170 is slid into end panels 120 at slots 127 until slots 171 of roof-locking piece 170 align with end panels 120. Roof-locking piece 170 is secured when it is pushed in a downward direction until the limits of slots are achieved. Roof-locking piece 170 secures roof piece 160 by virtue of its placement in slots 127 of end parts 120. Roof-locking piece 170 blocks roof piece 160 from sliding beyond its location.

Figure 10:
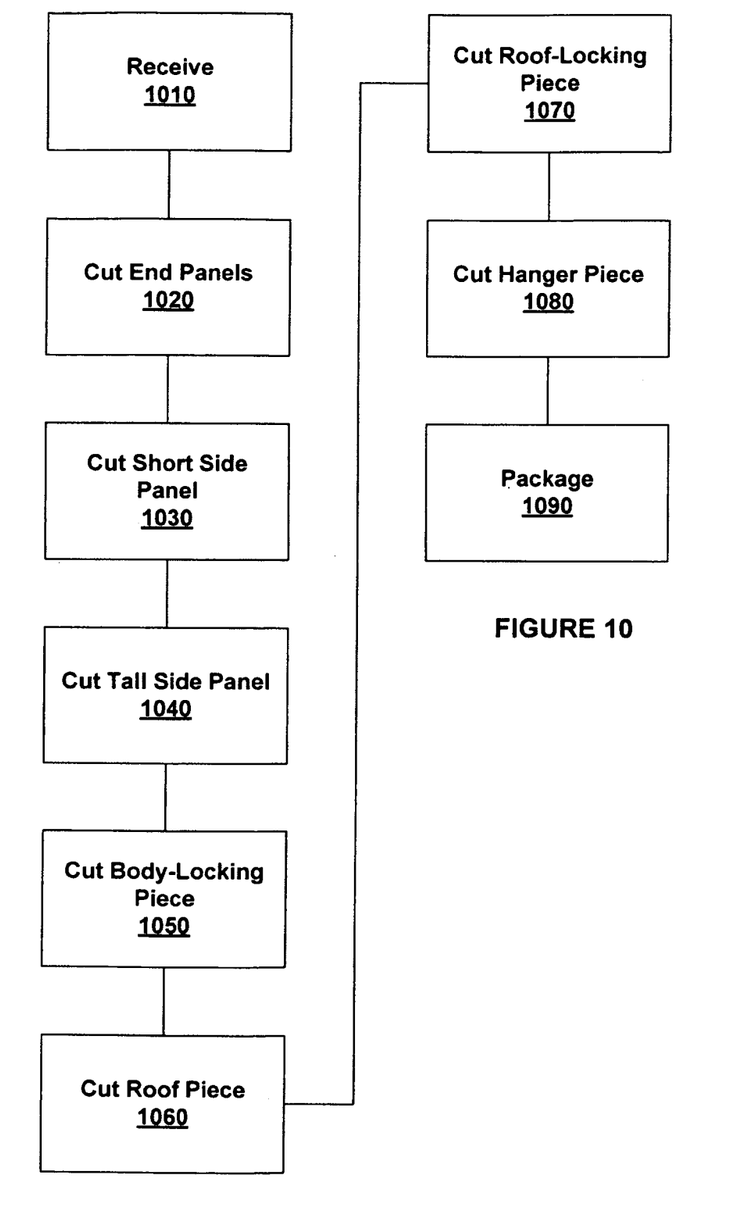
FIG. 10 illustrates a method of manufacturing the birdfeeder of FIG. 1, according to various embodiments of the invention.

FIG. 10 illustrates a method of manufacturing the birdfeeder 100 of FIG. 1, according to various embodiments of the invention. This method includes cutting a flat stock material to produce panels and/or pieces discussed elsewhere herein. Cutting may be accomplished using a mill, laser cutter, saw, electronic discharge cutting machine, router, stamping machine, or the like. Multiple pieces are optionally cut at the same time by stacking the stock material and cutting the entire stack at once using the same cutting device. As such, several birdfeeder 100 may be cut in parallel. The steps illustrated in FIG. 10 are optionally performed in alternative orders. In alternative embodiments, the cutting steps described herein are replaced by molding or other forming steps. More than one of the panels and/or pieces discussed herein is optionally cut from the same piece or multiple pieces of flat stock.

In a receive step 1010 a flat stock material is received. This flat stock material is of a thickness of desired parts of birdfeeder 100 and, as discussed elsewhere herein, may include a wide variety of materials. The received flat stock material may include one or multiple pieces.

In a cut end panels step 1020 the flat stock is cut to make end panels 120. This cutting results in a profile such as that illustrated in FIG. 2. Different tools are optionally used to cut different elements of end panels 120, and other parts discussed herein. For example, a mill may be used to cut opening 119 and a saw may be used to cut other elements.

In a cut short side panel step 1030 the flat stock is cut to make short panel 140. This cutting results in a profile such as that illustrated in FIG. 4. In a cut tall side panel step 1040 the flat stock is cut to make tall side panel 130. This cutting results in a profile such as that illustrated in FIG. 3.

In an optional cut body-locking piece step 1050 body-locking piece 150 is cut, optionally from the flat stock received in receive step 1010. This cutting results in a profile such as that illustrated in FIG. 5. In alternative embodiments, body-locking piece is cut from material having a round shape, or the like.

In an optional cut roof piece step 1060 roof piece 160 is cut, optionally from the flat stock received in receive step 1010. This cutting results in profiles such as those illustrated in FIG. 6. In an optional cut roof-locking piece step 1070 roof-locking piece 170 is cut, optionally from the flat stock received in receive step 1010. This cutting results in a profile such as that illustrated in FIG. 7. In alternative embodiment, roof-locking piece is cut from material having a round shape, or the like.

In an optional cut hanger piece step 1080 hanger piece 180 is cut, optionally from the flat stock received in receive step 1010. This cutting results in a profile such as that illustrated in FIG. 8.

In an optional package step 1090 one or more of the pieces and/or panels cut in the steps above are packaged as a birdfeeder kit. Those pieces and/or panels cut from the stock material received in receive step 1010 are optionally packaged in a flat parallel geometry, e.g., stacked flat together. The packaging may include a polymer film, cardboard, paper, foil, plastic, or the like. The packaging typically includes assembly instructions illustrating how to assemble birdfeeder 100 without tools and/or fasteners. The packaging is configured to hold the kit together.

Several embodiments are specifically illustrated and/or described herein. However, it will be appreciated that modifications and variations are covered by the above teachings and within the scope of the appended claims without departing from the spirit and intended scope thereof. For example, embodiments of the invention my include the use of force fitting, cryo-fitting, adhesives, or the like, or a combination thereof to secure assembly of the birdfeeder 100. In some embodiments, roof piece 160 includes material disposed to cover the troughs formed by extensions 133 and 143. This material is configured to shelter these troughs from rain. The assembly described herein may be adapted for alternative uses such as other types of animal feeders, shelters, fluid handlers, solid material handlers, or the like.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention.

Hence, these descriptions and drawings should not be considered in a limiting sense, as it is understood that the present invention is in no way limited to only the embodiments illustrated.

What is claimed is:

1. A birdfeeder system comprising:
    a pair of flat end panels each including a plurality of slots, the pair of flat end panels including at least one opening;
    a first side panel configured to slide simultaneously into at least two slots of each of the end panels, and including at least one slot; and
    a second side panel configured to slide simultaneously into at least two slots of each of the end panels and to slide into the slot of the first side panel, and configured to form a container, the container including the opening disposed adjacent to a trough formed by parts of the first side panel and the second side panel.

2. The system of claim 1, further comprising a body-locking panel configured to lock the second side panel to the first side panel by sliding into a slot of the second side panel.

3. The system of claim 2, wherein the pair of flat end panels, the first side panel, the second side panel and body locking panel form a stable structure without the use of fasteners.

4. The system of claim 1, further comprising a body-locking piece configured to slide into a slot of at least one of the flat end panels.

5. The system of claim 1, further comprising a flat roof piece configured to slide into a slot of the pair of flat end panels.

6. The system of claim 5, further comprising a roof-locking piece configured to lock the roof piece into the slot of the pair of flat end panels.

7. The system of claim 1, further comprising a hanger piece configured to slide into a slot of the pair of flat end panels and configured for attachment of a support near a center of gravity of the system.

8. The system of claim 1, wherein the pair of flat end panels, the first side panel and the second side panel are each cut from flat stock material.

9. The system of claim 1, wherein the container is v-shaped and configured to funnel contents of the container to the opening.

10. The system of claim 1, wherein the first side panel comprises an ultraviolet light resistant material.

11. The system of claim 1, wherein the trough is configured to receive birdseed from the container.

12. The system of claim 1, wherein the pair of flat end panels, the first side panel and the second side panel are configured to be assembled into a birdfeeder.

13. The system of claim 12, wherein the pair of flat end panels, the first side panel and the second side panel are configured to be assembled together without fasteners.

14. The system of claim 12, wherein the pair of flat end panels, the first side panel and the second side panel are configured to be assembled using keyed mortise and tenon connections.

15. The system of claim 1, further comprising packaging configured to hold the pair of flat end panels, the first side panel and the second side panel, in a flat stacked geometry.

16. The system of claim 1, wherein the at least two slots of each of the flat end panels are each characterized by a width approximately equal to a thickness of the second side panel.

17. The system of claim 1, wherein the first side panel includes at least one slot and is further configured to slide into at least two slots of each of the end panels, the at least two slots of each of the end panels are each characterized by a width approximately equal to a thickness of the first side panel.

18. The system of claim 1, wherein the first side panel, the second side panel and a flat roof piece are configured to connect to each other to form a three sided triangle.

* * * * *